L. BONSIEUR.
PHONOGRAPH.
APPLICATION FILED SEPT. 21, 1916.

1,265,295.

Patented May 7, 1918.

Inventor
Le Bonsieur
By J.O. Richey
His Attorney

UNITED STATES PATENT OFFICE.

LE BONSIEUR, OF ELYRIA, OHIO, ASSIGNOR TO THE GARFORD MANUFACTURING COMPANY, OF ELYRIA, OHIO, A CORPORATION OF OHIO.

PHONOGRAPH.

1,265,295.          Specification of Letters Patent.          Patented May 7, 1918.

Application filed September 21, 1916. Serial No. 121,362.

*To all whom it may concern:*

Be it known that I, LE BONSIEUR, a citizen of the United States, residing at Elyria, in the county of Lorain and State of Ohio, have invented certain new and useful Improvements in Phonographs; and I do hereby declare the following to be a full, clear, and exact description of the invention, such as will enable others skilled in the art to which it appertains to make and use the same.

My invention relates to improvements in motors and more particularly to the elimination of foreign sounds and noises during the operation of the machine, to the cheapening and simplifying of the construction thereof and to the elimination of play or back-lash between the parts.

These and other objects of my invention and the invention itself will, I believe, be clear from a description of the embodiment of the invention.

Figure 1:
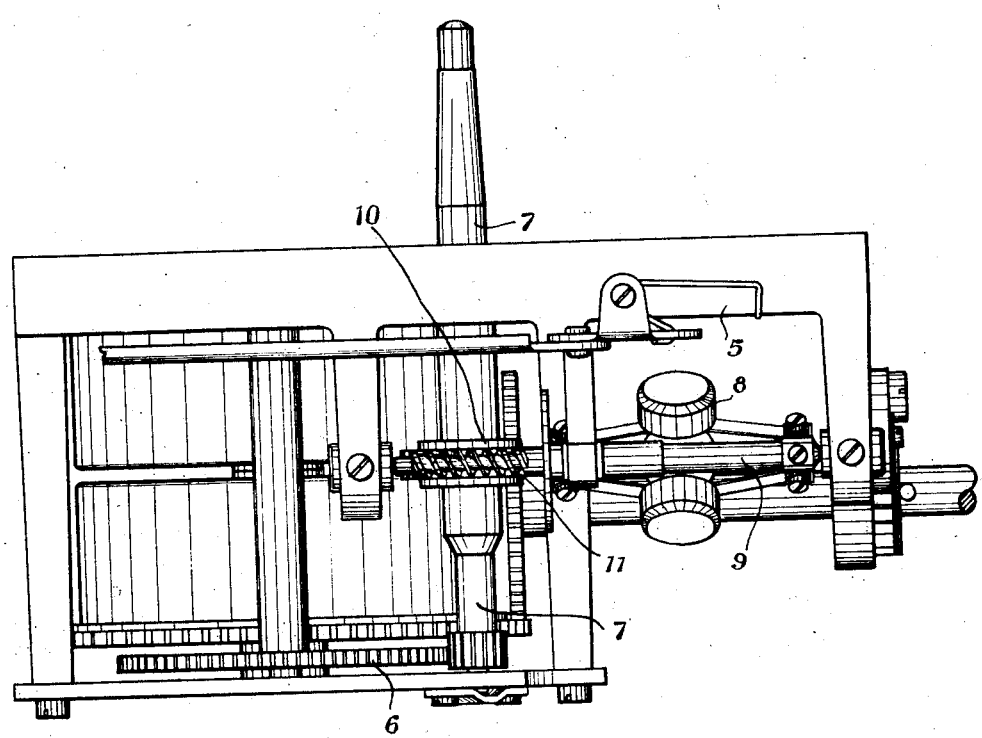
Figure 1 is a view of a motor incorporating my invention.
Figure 2:
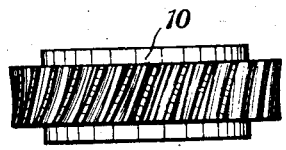
Figs. 2, 3 and 4 are detail views of the mechanism employed.
Figure 3:
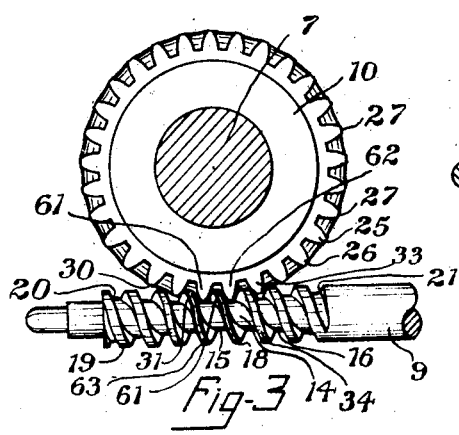

Referring now to the drawing, at 5 is shown the frame of a phonograph motor, and at 6 a motor, here illustrated as a spring motor for driving the turn-table shaft 7 of the phonograph. A record disk support, not shown, is mounted upon this shaft and is rotated with the record. The governors, here shown as ball governors, are illustrated at 8. The governor shaft is shown at 9. A worm gear wheel is shown at 10 on the shaft 7, and a worm is shown at 11 upon the shaft 9. The worm convolutions increase in height and the valleys between the adjacent convolutions of the worm increase in depth from the ends 12 and 13 of the worm to the center 14 thereof. For example, the valley 15 is deeper than the valley 16, and the convolution at 18 is higher than the convolution at 19. To get the best results, these depths and heights increase respectively from the end to the center in a direct ratio, preferably so that the line 20—21 defining the bottom of the valleys between the convolutions is an arc of a circle, here shown as of greater radius than the radius of the worm wheel 10. The teeth 25 of the worm wheel are tapered off, as shown at 26 and the ends 27 are preferably cut upon the arc of a circle.

Figure 4:
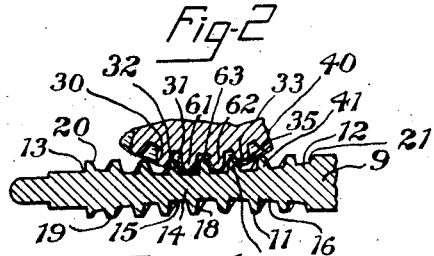

In my invention, as will be seen in Fig. 4, two teeth of the worm wheel engage the worm at the same time, and these teeth are spaced apart, and so bind the parts together that there will be no play or back-lash between the shafts 7 and 9. In the embodiment shown, there will be two unengaged or idle teeth intermediate the two engaged or busy teeth on the wheel, and one idle or unengaged convolution on the worm between the busy or engaged convolutions. The idle teeth on the wheel are shown at 61 and 62 and the idle worm convolution at 63.

Referring now to Fig. 4, it will be seen that the tooth 30 engages the convolution 31 at the point 32, and at the same time the tooth 33 engages the convolution 34 at the point 35. As the tooth 40 of the worm wheel engages the convolution 41, the tooth 61 will engage the convolution 63 and so on, as the wheel 10 revolves, maintaining throughout the operation the engagement exemplified by the position of the parts in Fig. 4. As a result of this two-point engagement between the wedge surfaces of the parts, the wheel 10 will have no movement independent of the worm shaft, so that the parts will at all times be held together, preventing any play or back-lash and at the same time facilitating the operation of the device. As will be seen, there will be surface engagement between the teeth and convolution, which will be made and broken by sliding contact. There will be no striking of the tops of the teeth against the bottom of the valleys, and owing to the sliding, progressive and easy engagement and disengagement of the teeth, the operation will be practically noiseless.

Moreover, in the use of standard hobbing machines, it will be easier and cheaper to cut the form of worm employed in my invention than the old forms of worms, since a circular hobbing device may be employed. Thus, I have not only produced a motor which is more efficient in operation, but have also cheapened the construction thereof.

While I have shown and described my invention as used between the record support shaft and the governor shaft, it will be understood that it may be employed between other shafts where there is back-play or noise in the operation.

I have shown this particular embodiment and these particular details for the purpose of explaining my invention, and not that I wish to be limited thereto, for it will be obvious to those skilled in the art that numerous and extensive departures may be made from the form and details shown, without departing from the spirit of the invention.

I claim:—

1. In a phonograph, the combination of a motor, a record support shaft, governors for the motor and a governor shaft, a worm on the governor shaft provided with convolutions and valleys between the convolutions, the valleys increasing progressively in depth from the end to the center of the worm and the convolutions increasing in height progressively in the same ratio as the valleys increase in depth from the ends to the center of the worm, the core of the worm being thinner at the center than at the ends, and a worm wheel on the record support shaft having teeth meshing with convolutions of the worm.

2. In a phonograph, the combination of a motor, a record support shaft and means through which the motor drives the shaft, a governor and a governor shaft, a worm on the governor shaft provided with convolutions increasing in height from the ends to the center of the worm, the valleys from the ends to the center increasing in depth from the ends to the center of the worm, and a worm wheel on said record support shaft having a plurality of teeth, two of which engage the worm simultaneously.

3. In a phonograph, the combination of a motor, a record support shaft and means through which the motor drives the record support shaft, governors for the motor and a governor shaft, a worm on the governor shaft provided with convolutions and valleys between the convolutions, the valleys increasing in depth from the end to the center of the worm and the convolutions increasing in height from the ends to the center of the worm, the core of the worm being thinner at the center than at the ends and a worm wheel on the record support shaft provided with a plurality of teeth, two of which engage convolutions of the worm simultaneously, there being one worm convolution between the convolutions of the worm engaged by the teeth of the worm wheel and there being two idle teeth between the busy teeth of the worm wheel.

4. In a phonograph, the combination of a motor, a record support shaft and means through which the motor drives said shaft, governors for the motor and a governor shaft provided with a worm, a worm wheel on said record support shaft provided with teeth adapted to engage the convolutions on the worm shaft, two of the teeth engaging the worm simultaneously, there being two idle teeth on the worm wheel intermediate the busy teeth thereon, there being one idle convolution of the worm between the busy convolutions thereof during the operation of the machine.

5. In a phonograph, the combination of a motor, a record support shaft and means through which the motor drives said shaft, governors for the motor and a governor shaft provided with a worm having convolutions thereon, the valleys of the convolutions increasing in depth from each end to the center of the worm, the bottoms of the valleys being arc-shaped and each on a line continuous with the arc of a circle drawn through the bottom of each of the valleys, a worm wheel on the record support shaft adapted to coöperate with the worm to drive the governors, two non-adjacent teeth of the worm wheel engaging simultaneously two non-adjacent convolutions of the worm all during the operation of the worm.

6. In a phonograph, the combination of a motor, a record support shaft and means through which the motor drives the record support shaft, governors for the motor and a governor shaft, a worm on the governor shaft provided with convolutions and valleys between the convolutions, the valleys increasing in depth from the end to the center of the worm and the convolutions increasing in height from the ends to the center of the worm, the core of the worm being thinner at the center than at the ends, and a worm wheel on the record support shaft provided with a plurality of teeth, two of which make sliding contact with convolutions of the worm, said teeth having surface engagement with said convolutions simultaneously, there being one worm convolution between the engaged convolutions of the worm and two teeth on the worm wheel between the engaged teeth.

7. In a phonograph, the combination of a motor, a record support shaft, governors for the motor and a governor shaft, a worm on the governor shaft provided with convolutions, and valleys between the convolutions, the valleys increasing progressively in depth from the ends to the center of the worm so that were a plane passed through the long axis of the shaft the line in said plane passing along and joining the bottoms of the valleys would be an arc of a circle, and the convolutions increasing correspondingly progressively in height from the ends to the center of the shaft, the tops of the convolutions being always equidistant from the long axis of the shaft, the core of the worm being thinner at the center than at the ends and a worm wheel on the record support shaft having teeth meshing with convolutions of the worm.

8. In a phonograph, the combination of a drive shaft and a driven shaft, a worm wheel on one of said shafts, and a worm on the other, said worm wheel being provided with teeth adapted to make sliding contact with the convolutions on the worm when the parts are in operation, two of the teeth on the worm wheel making surface engagement with two convolutions on the worm simultaneously, an idle tooth on the worm gear between the busy teeth and an idle convolution on the worm between the busy convolutions.

9. In a phonograph, the combination of a driven shaft and a drive shaft, a worm gear on one of said shafts and a worm on the other, a plurality of teeth engaging a plurality of convolutions on the worm simultaneously, idle teeth on the gear between the busy teeth and an idle convolution on the worm between the busy convolutions.

10. In a phonograph, the combination of a motor, a record support shaft, governors for the motor and a governor shaft, a worm on the governor shaft provided with convolutions, and valleys between the convolutions, the valleys increasing in depth from the end to the center of the worm and the convolutions increasing in height from the ends to the center of the worm, the core of the worm being thinner at the center than at the ends, and a worm wheel on the record support shaft having teeth meshing with convolutions of the worm.

In witness whereof, I have signed my name hereunto at Elyria, in the county of Lorain and State of Ohio, this 14 day of September, 1916.

LE BONSIEUR.

Copies of this patent may be obtained for five cents each, by addressing the "Commissioner of Patents, Washington, D. C."